Dec. 13, 1960   N. A. NELSON ET AL   2,963,958
BALE TYING MECHANISM AND DRIVE
Filed April 26, 1955   10 Sheets-Sheet 1

INVENTORS.
NORAL A. NELSON
WILLIAM A. WATHEN
BY
ATTORNEYS.

Dec. 13, 1960    N. A. NELSON ET AL    2,963,958
BALE TYING MECHANISM AND DRIVE

Filed April 26, 1955    10 Sheets-Sheet 2

INVENTORS.
NORAL A. NELSON
WILLIAM A. WATHEN
BY
ATTORNEYS.

Dec. 13, 1960   N. A. NELSON ET AL   2,963,958
BALE TYING MECHANISM AND DRIVE
Filed April 26, 1955   10 Sheets-Sheet 5

INVENTORS.
NORAL A. NELSON
WILLIAM A. WATHEN
BY
Carlson, Pitzner, Hubbard & Wolfe
ATTORNEYS.

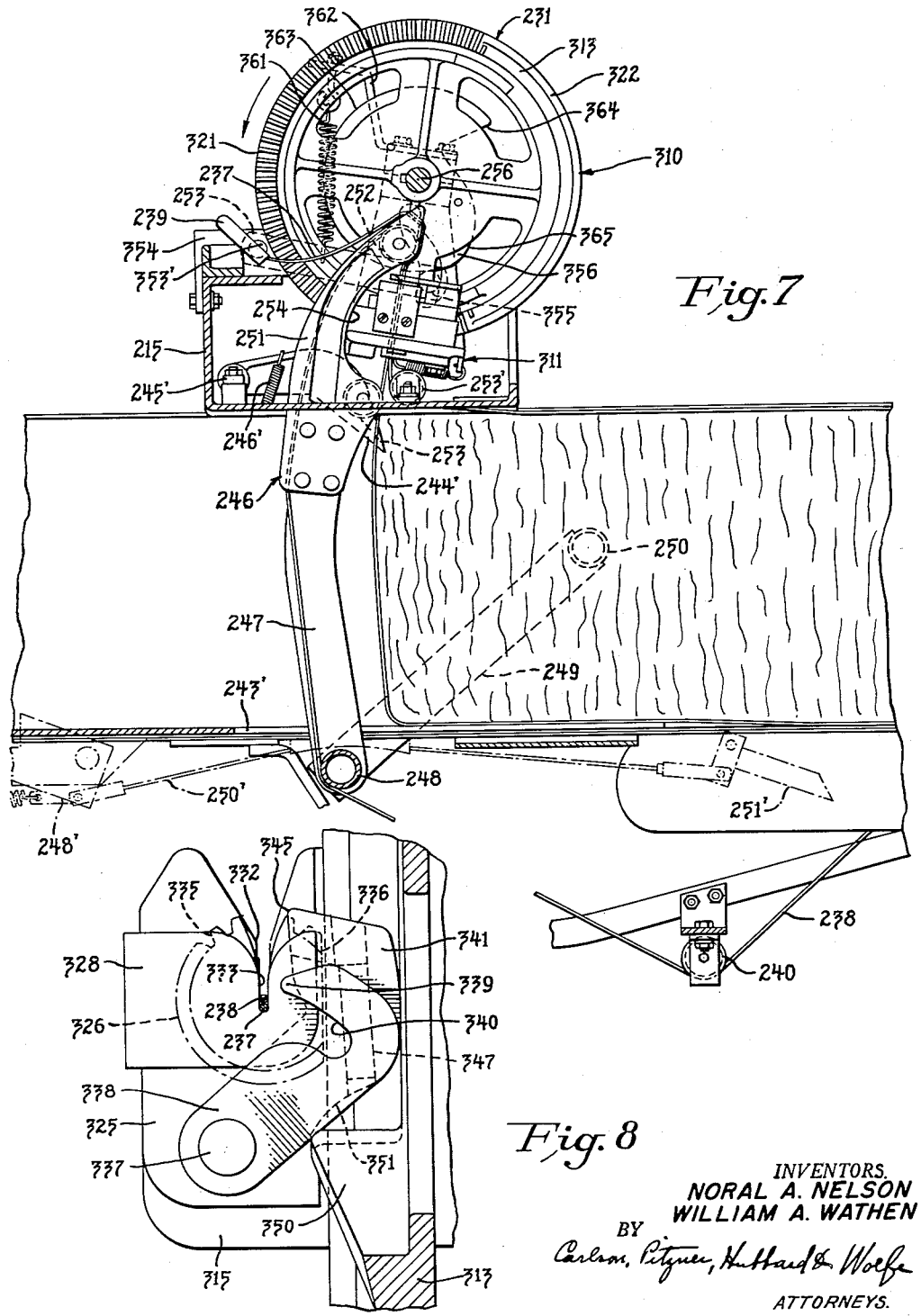

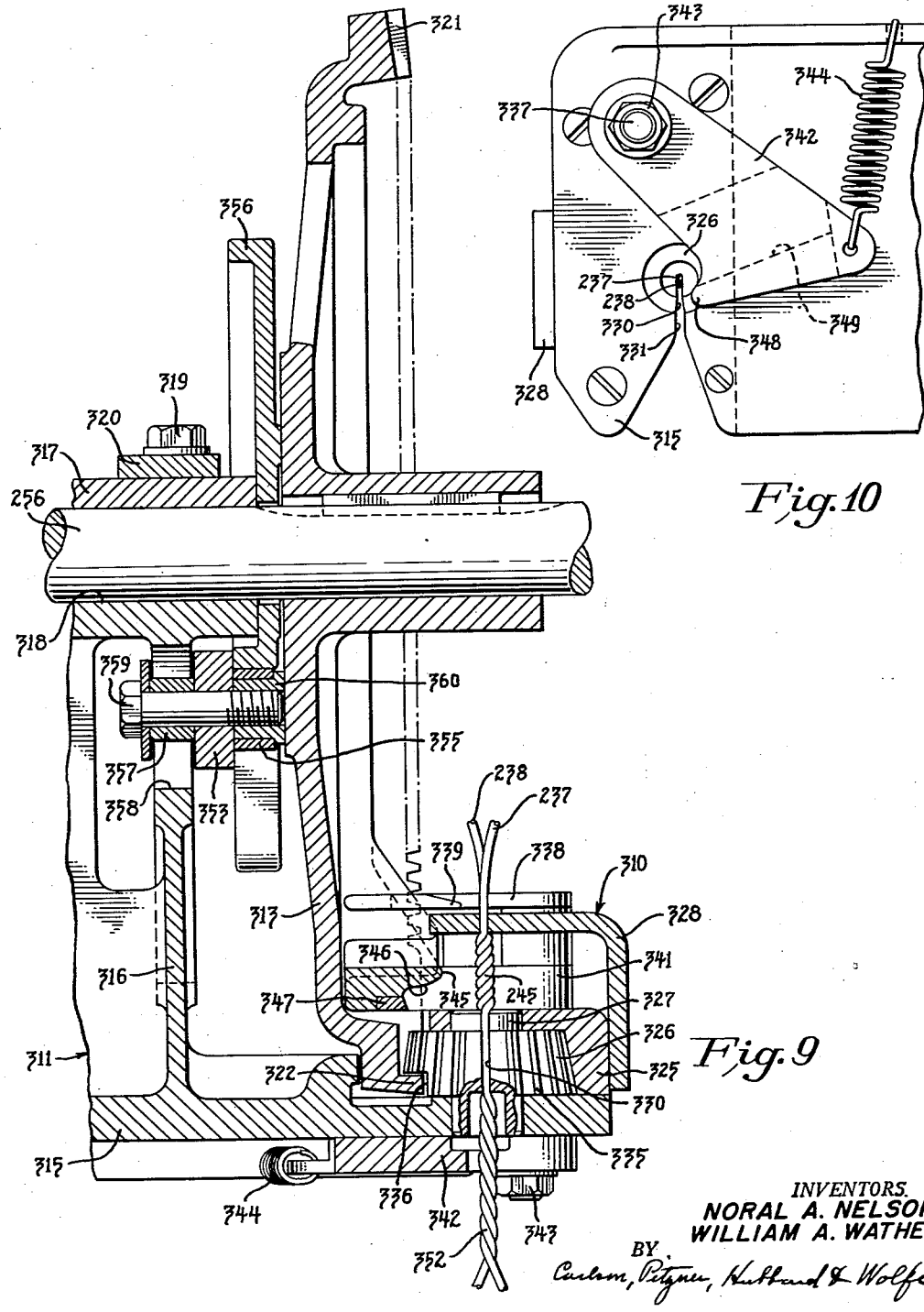

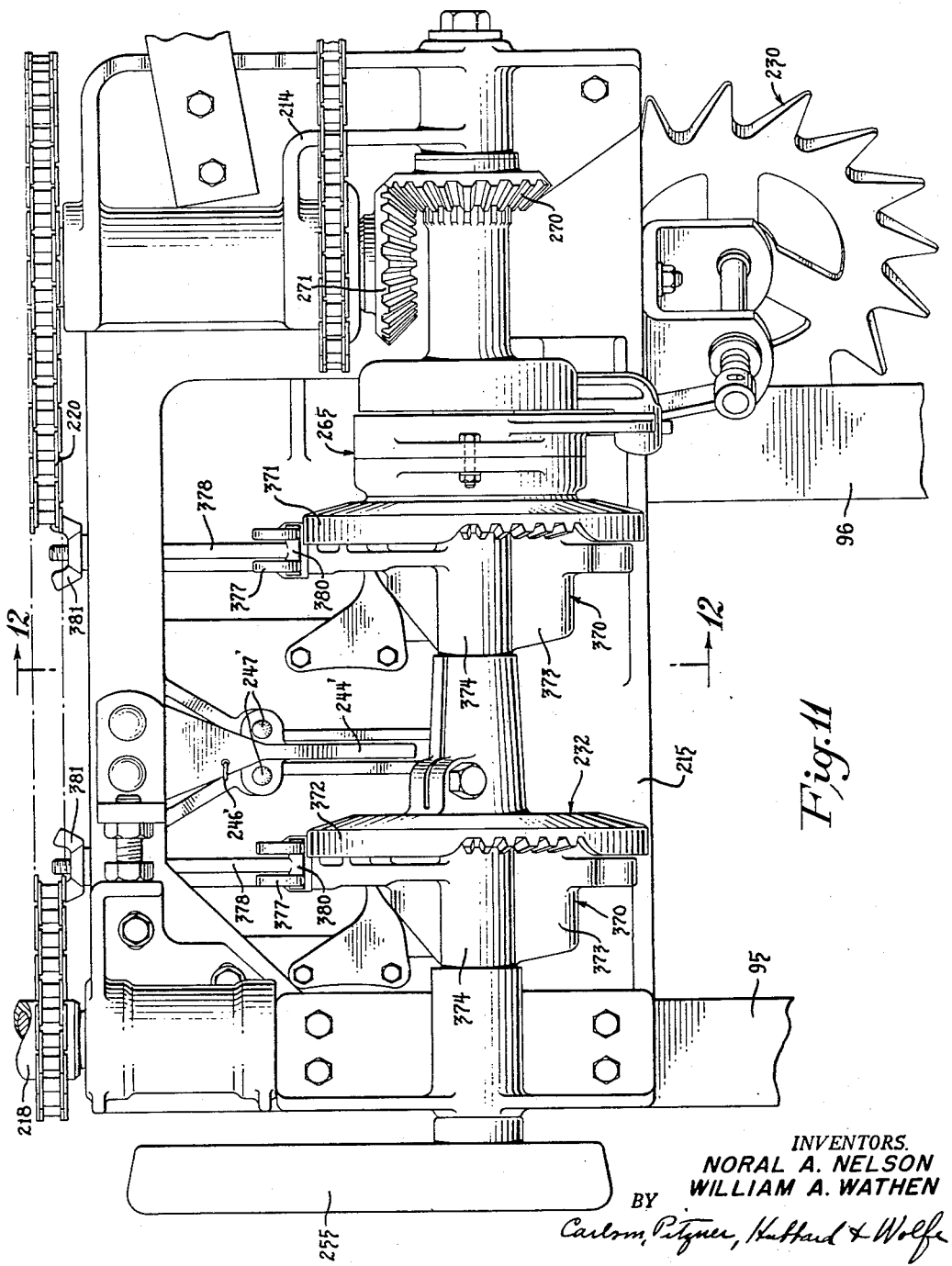

Dec. 13, 1960    N. A. NELSON ET AL    2,963,958
BALE TYING MECHANISM AND DRIVE
Filed April 26, 1955    10 Sheets-Sheet 9

INVENTORS.
NORAL A. NELSON
WILLIAM A. WATHEN
BY
Carlsen, Pitzner, Hubbard & Wolfe
ATTORNEYS.

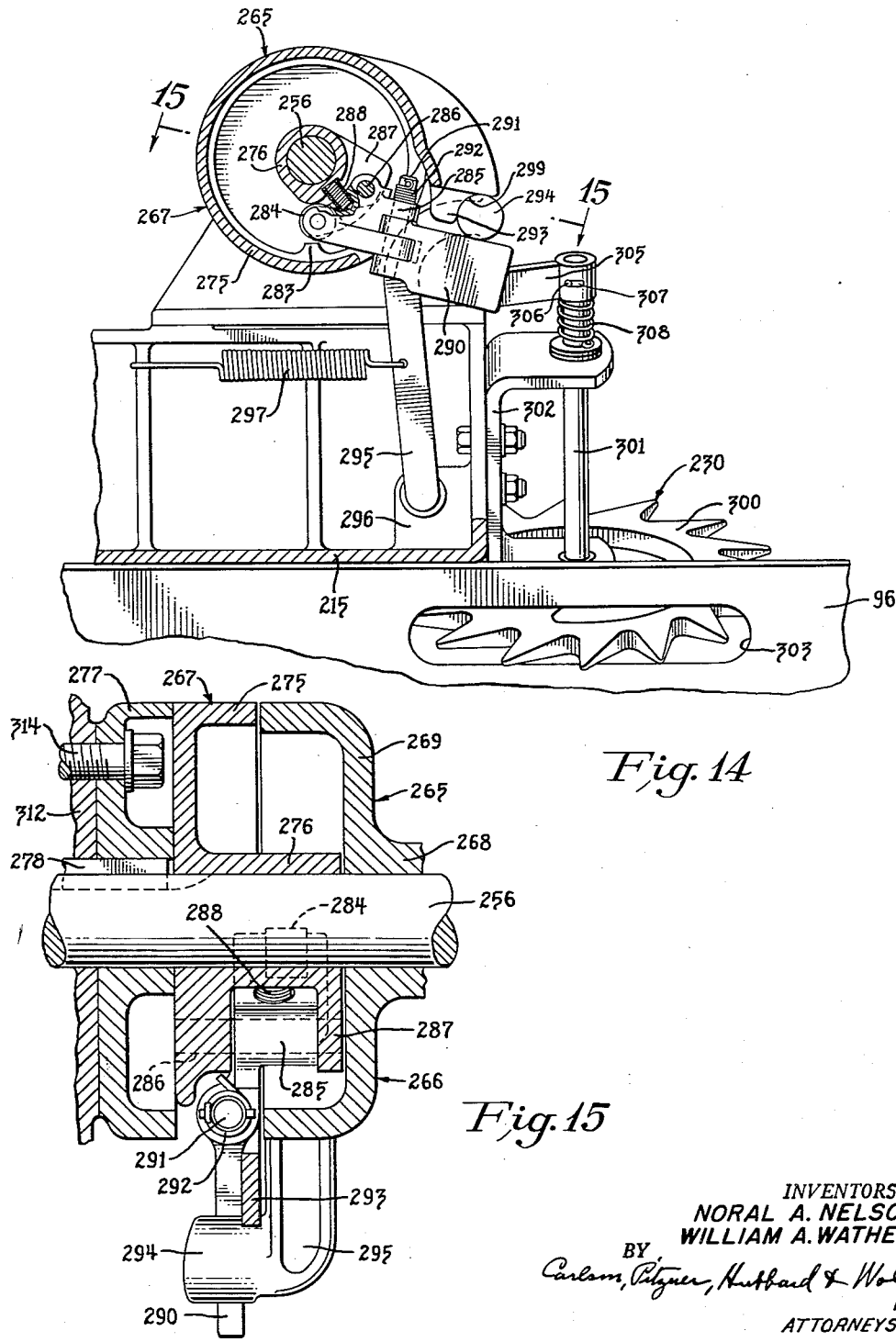

United States Patent Office 2,963,958
Patented Dec. 13, 1960

2,963,958

BALE TYING MECHANISM AND DRIVE

Noral A. Nelson, Holland, and William A. Wathen, Detroit, Mich., assignors to Massey-Ferguson Inc., a corporation of Maryland Filed Apr. 26, 1955, Ser. No. 504,081

8 Claims. (Cl. 100—11)

The invention relates to machines for compressing fibrous material, such as hay, straw and comparable crop material, into bales, and it is more particularly concerned with mechanism for automatically tying the bales prior to their discharge from the machine.

One object of the invention is to provide improved tying mechanism that is readily adaptable to use either wire or twine for tying.

Another object is to provide an improved bale tying mechanism in which the tying units are automatically retracted after a tying operation to facilitate withdrawal of the needles.

Another object is to provide improved bale tying mechanism in which the tying units can be swung into a position to afford convenient access for repair, adjustment or other attention.

Still another object is to provide a simple, dependable unit for joining two sections of a wire strand to form a closed loop by twisting sections of the wires together and further operative to sever the wires intermediate the twisted joint so as to maintain the continuity of both the loop and the strand.

A further object is to provide a wire tying unit embodying novel means for bending the twisted ends of the wires to increase the holding power of the joint formed by the twist.

It is also an object of the invention to provide an improved clutch for driving the bale tying mechanism which is simple and rugged in construction and efficient and reliable in operation.

Other objects and advantages of the invention will become apparent from the following detailed description of the preferred embodiment illustrated in the accompanying drawings, in which Figure 1 is a perspective view of a field-type baler embodying the features of the invention, the baler being shown coupled to a tractor.

Fig. 7 is a fragmentary sectional view similar to Fig. 5 showing the wire twisting mechanism in operating position.

Fig. 8 is a detailed view of one of the wire twisting units taken in a plane substantially on the line 8—8 of Fig. 5.

Fig. 9 is a fragmentary sectional view taken in a plane substantially on the line 9—9 of Fig. 5.

Fig. 10 is a bottom view of the wire twisting unit shown in Figs. 8 and 9.

Fig. 11 is a view similar to Fig. 4 showing a twine knotter installed in place of the wire twister.

Fig. 14 is a fragmentary sectional view taken in a vertical plane substantially on the line 14—14 of Fig. 4.

Fig. 15 is a sectional view of the clutch mechanism for the bale tier taken in a plane substantially on the line 15—15 of Fig. 14.

For purposes of illustration, a preferred embodiment of the invention has been shown and will be described herein in some detail. It is to be understood, however, that it is not intended that the detailed character of the disclosure should limit the invention to such particulars. On the contrary, the intention is to cover all modifications and adaptations falling within the spirit and scope of the invention as it is more broadly and generally characterized by the appended claims.

General environment

To better illustrate the functioning of the mechanisms constituting the present invention in the environment in which they are designed to operate, they have been shown as incorporated in an agricultural baler B (Fig. 1) of the type disclosed and claimed in the co-pending application of Noral A. Nelson, Serial No. 504,080, filed April 26, 1955 which issued as Patent No. 2,862,347. The baler B is a mobile field or pickup baler, but it will be evident that the invention is not limited to use in that particular type of baler.

Figure 1:
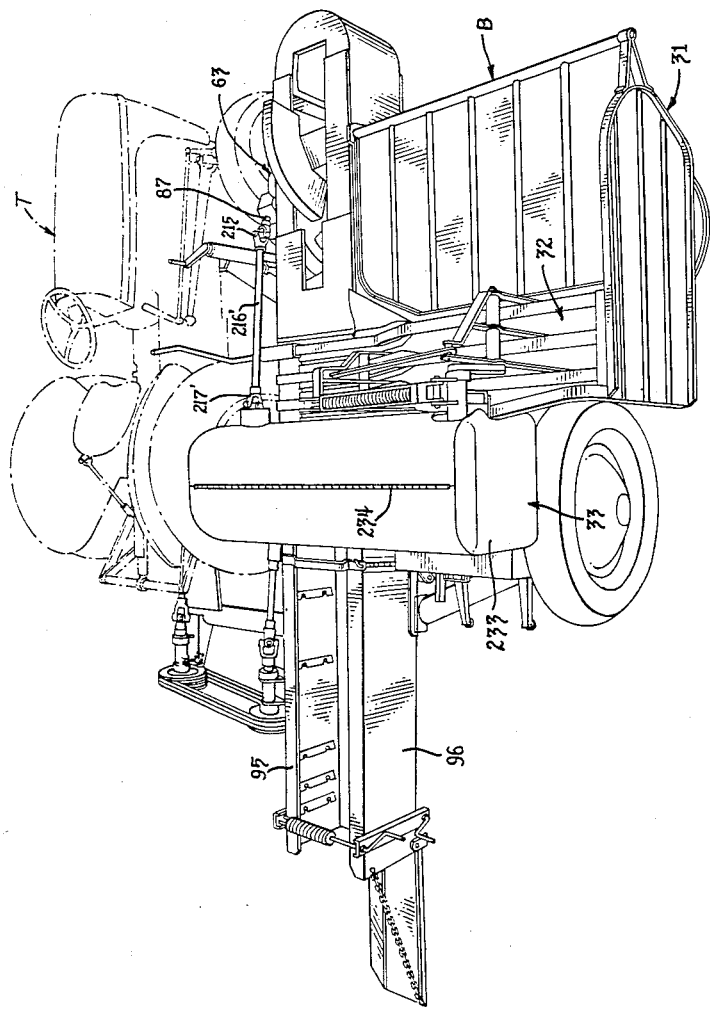

Referring to Fig. 1 of the drawings, the exemplary baler is adapted to be coupled to a tractor T as shown. When traversed along a windrow of hay or comparable crop material, pickup mechanism 31 at the front of the baler picks up the material from the windrow and delivers it to a horizontal platform disposed at one side of and communicating through a suitable opening with the baling chamber of the implement. Transfer mechanism 32 feeds the material along the platform and packs it into the baling chamber in successive batches.

In the particular baler illustrated, the baling chamber is rectangular in cross section and is formed in part by a pair of channel-shaped side members 95 and 96 assembled in spaced, parallel relation. The material received in the baling chamber is compressed into firm bales by a plunger reciprocating longitudinally in the chamber. The reciprocation of the plunger and the operation of the transfer mechanism are timed and coordinated by means of a common drive from a transmission 63 which also serves to drive automatic bale tying mechanism indicated generally at 33 (Figs. 3 and 4) constituting the subject matter of the instant invention. The timing is such that the bale is gradually built up as the batches of material are fed into the baling chamber between successive reciprocations of the plunger.

As the bale increases in length, it is gradually pushed back carrying with it the previously formed bale which serves as a retractable wall for the rear end of the baling chamber. Provision is made for imposing a predetermined but adjustable resistance to the rearward movement of the completed bale and such resistance determines the degree to which the material is compacted by the plunger.

Bale tying mechanism

Figure 3:
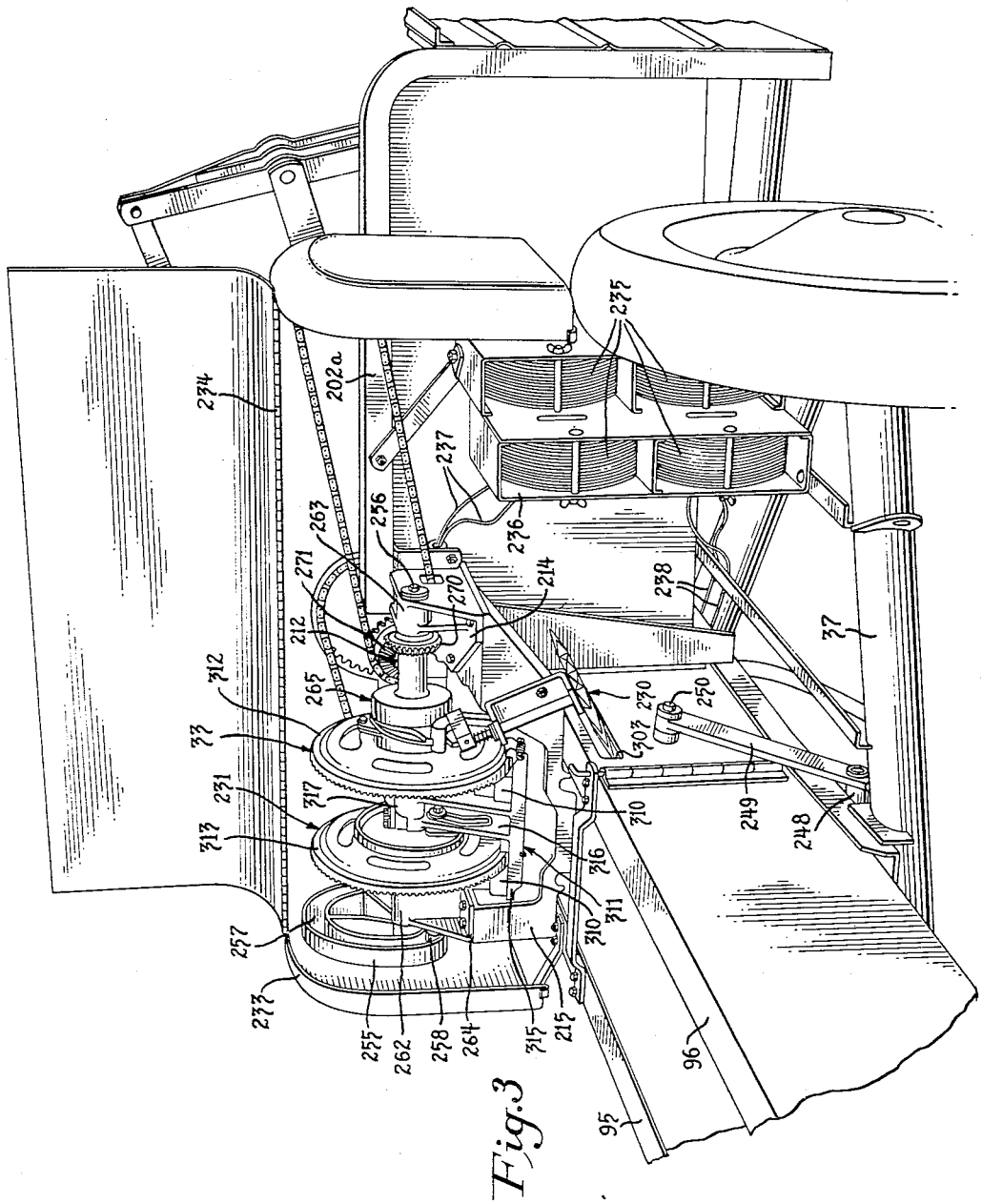
Fig. 3 is a fragmentary perspective view of the baler as seen from the rear with the tier housing cover raised to show details of the tying mechanism.

When the bale in process of formation reaches a predetermined length as determined by a metering device 230, it is automatically tied by the tying mechanism 33. In accordance with the invention, the tying mechanism may be equipped for use with either wire or twine. In other words, the mechanism is constructed and arranged for interchangeably accommodating a wire twister 231 (Figs. 4 and 7–10) or a twine knotter 232 (Figs. 11 and 12) as desired. The entire mechanism is supported on a frame structure 215 rigidly mounted in overlying relation to the baling chamber and enclosed in a sheet metal housing 233 having its rear portion hinged as at 234 to swing upwardly and thus provide access to the mechanism. The strand material employed for tying the bales is supplied in continuous strands from a group of spools or rolls 235 carried in compartments provided in a housing 236 supported between the frame members 37 and 202a, as shown in Fig. 3.

The exemplary baler is equipped for tying bales with two strands wrapped lengthwise of the bales and consequently two similar strand uniting units, either wire twisters or twine knotters, are provided. To provide continuous strands for wire tying, the tying material is supplied from four spools, each disposed in a separate compartment in the housing 236. As a matter of convenience, the compartments are arranged in pairs, one above the other. Wires 237 from the spools in the two upper compartments are led across the top of the bale. Wires 238 from the spools in the two lower compartments are led across the bottom of the bale. In operation the corresponding wires 237 and 238 are joined to define a continuous loop across the end of the baling chamber, as will appear presently.

Figure 4:
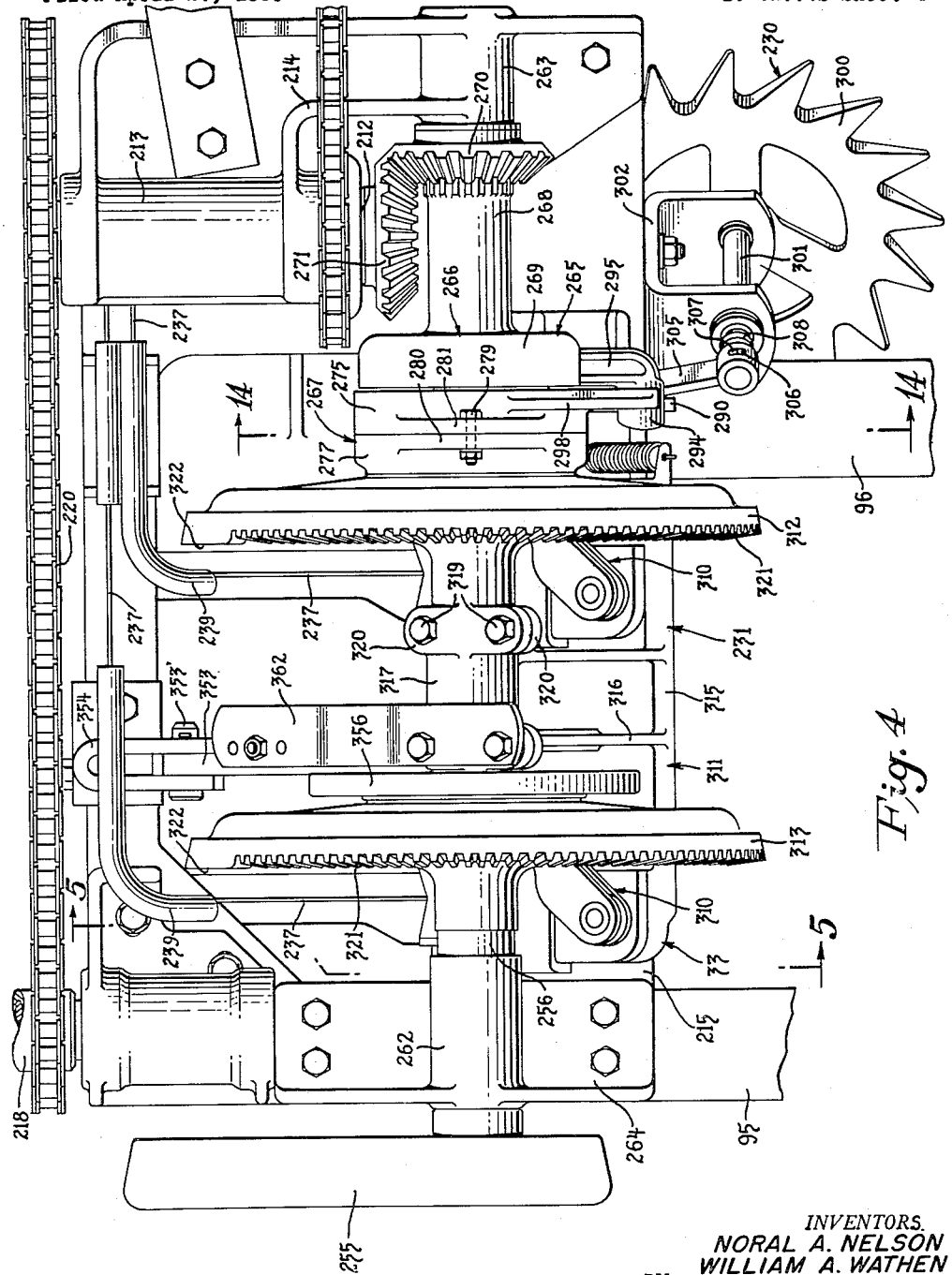
Fig. 4 is an enlarged plan view of the baler tying mechanism as arranged for use with baling wire.
Figures 5, 6:
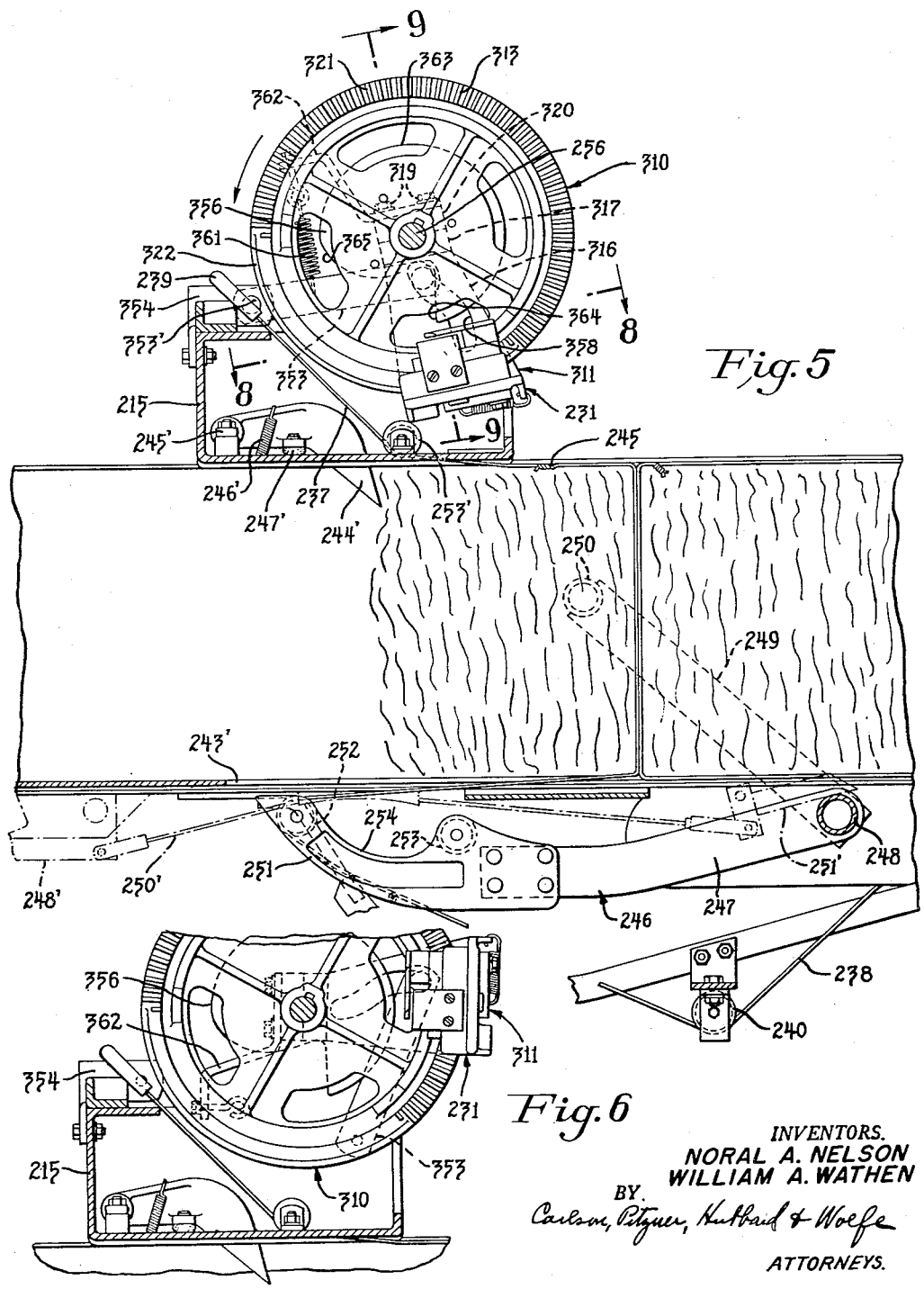
Fig. 5 is a fragmentary sectional view taken in a vertical plane substantially on the line 5—5 of Fig. 4.
Fig. 6 is a fragmentary sectional view similar to Fig. 5 showing the wire twisting mechanism in retracted position.

To properly locate the wires with respect to the bale, the upper wires 237 are respectively led transversely across the baling chamber and then rearwardly thereof to a pair of tubular guides 239 which are bent at right angles to direct the wires lengthwise along the top of the bale in process of being formed, as shown in Fig. 4. The guides, of course, are positioned to present the wires for engagement by the associated wire twisting unit, as shown in Figs. 5–7. The lower wires 238 are similarly directed into operative relation with the bale by guide rolls 240 (Fig. 7) in cooperation with guide rolls carried by the needle assembly, as will appear presently.

The upper and lower wires of each pair when joined, as by a splice 245 (Fig. 5), form a continuous vertical run or loop across the baling chamber. Consequently as the bale is pushed rearwardly in the chamber by the baling plunger, the two wires are pulled out so as to maintain wraps about the end, the top and the bottom sides of the bale. Upon completion of the bale, that is, when it attains a desired length, a pair of curved needles 246 normally disposed below the baling chamber, as shown in Fig. 5, are projected through suitable openings 243' in the bottom of the baling chamber and then upwardly through the chamber to the position shown in Fig. 7. In their upward movement, the needles carry the lower wires 238 upwardly through the baling chamber and alongside the upper wires 237, as shown in Fig. 7. The pairs of wires are then joined by the wire twister which also severs the wires in a manner that leaves those around the bale securely joined. The companion upper and lower wires from the reels are also joined to provide the continuous loop for the next bale.

The tying operation takes place while the baling plunger is retracted from the bale. Provision is therefore made for holding the material at the forward end of the bale in place until the tying wire is wrapped around it. The holding means, as shown, comprises a stop finger 244' (Figs. 5–7 and 11) pivoted as at 245' on a part of the frame structure 215 overlying the baling chamber and having its hook-shaped free end extending down into the chamber. A spring 246' urges the finger toward the operated position shown in the drawings but permits it to retract upwardly as each charge of material is pushed back by the baling plunger. Resilient elements 247' provided on the finger coact with the frame structure to cushion the shock as the finger is snapped back to operated position.

The needles 246 are alike and, as shown in Fig. 5, each comprises a curved bar 247 welded or otherwise rigidly fixed at one end of a cross shaft 248. The cross shaft is secured between the lower ends of a pair of depending arms 249 respectively pivoted as at 250 at opposite sides of the baling chamber. At their other or free ends, each of the needle bars 247 terminates in a tip portion 251 comprising a pair of plates spaced apart to accommodate guide rollers 252 and 253. The rollers are spaced apart longitudinally of the needles so as to present an unobstructed length of the wire to the tier, as will appear presently. Each lower wire 238 is led over the guide roller 252 of the associated needle and consequently when the needles swing upwardly, both of the wires are carried upwardly through the baling chamber. When the needles approach a substantially vertical position, the companion guide rollers 253 engage the wires to maintain them taut during the tying operation. In their final movements, the needle carried rollers also engage the upper wires 237 and thus carry the wires together in pairs in side-by-side relation to the twisting unit. Guide rolls 253' (Figs. 5–7) cooperating with the upper wires 237 prevent them from being lifted from the bale during the tying operation. To afford clearance for the tying mechanism the tip 251 is recessed as at 254 between the rollers.

The needle assembly is rocked between the idle or rest position, as shown in Fig. 5, and the fully operated position, shown in Fig. 7, by a cam 255 (Figs. 3 and 4) mounted on a cyclically driven shaft 256 which also serves to drive the wire twister 231 or the twine knotter 232. The cam 255 has a continuous suitably shaped groove 257 (Fig. 3) in its inner face within which rides a follower 258 carried on the upper end of a lever pivoted intermediate its ends on the frame structure of the baler and connected by a suitable link with one of the arms 249, in this instance, the arm at the inboard side of the baling chamber.

To prevent damage to the needles 246 in case they become jammed in or are not withdrawn from the baling chamber before the next plunger advance, provision is made for positively blocking the plunger advance. This blocking means may be of the type shown in the co-pending application of Noral A. Nelson, William A. Wathen and Howard G. Thompson, Serial No. 504,084, filed April 26, 1955, which issued as Patent No. 2,882,813. Briefly, the blocking means includes a stop element 248' (Fig. 5) pivoted below the baling chamber and adapted to swing through a slot in the bottom of the chamber into and out of the path of the plunger. A spring yieldably urges the stop to blocking position. Through the medium of a flexible tension member 250' connected to a pivoted actuator 251' engageable by a part of the needle assembly, the stop is withdrawn from the path of the plunger when the needle assembly is swung to the withdrawn position shown in Fig. 5. As the assembly is swung to operated position, tension on the member 250' is relieved permitting the stop to swing to blocking position under the influence of its spring.

Figure 2:
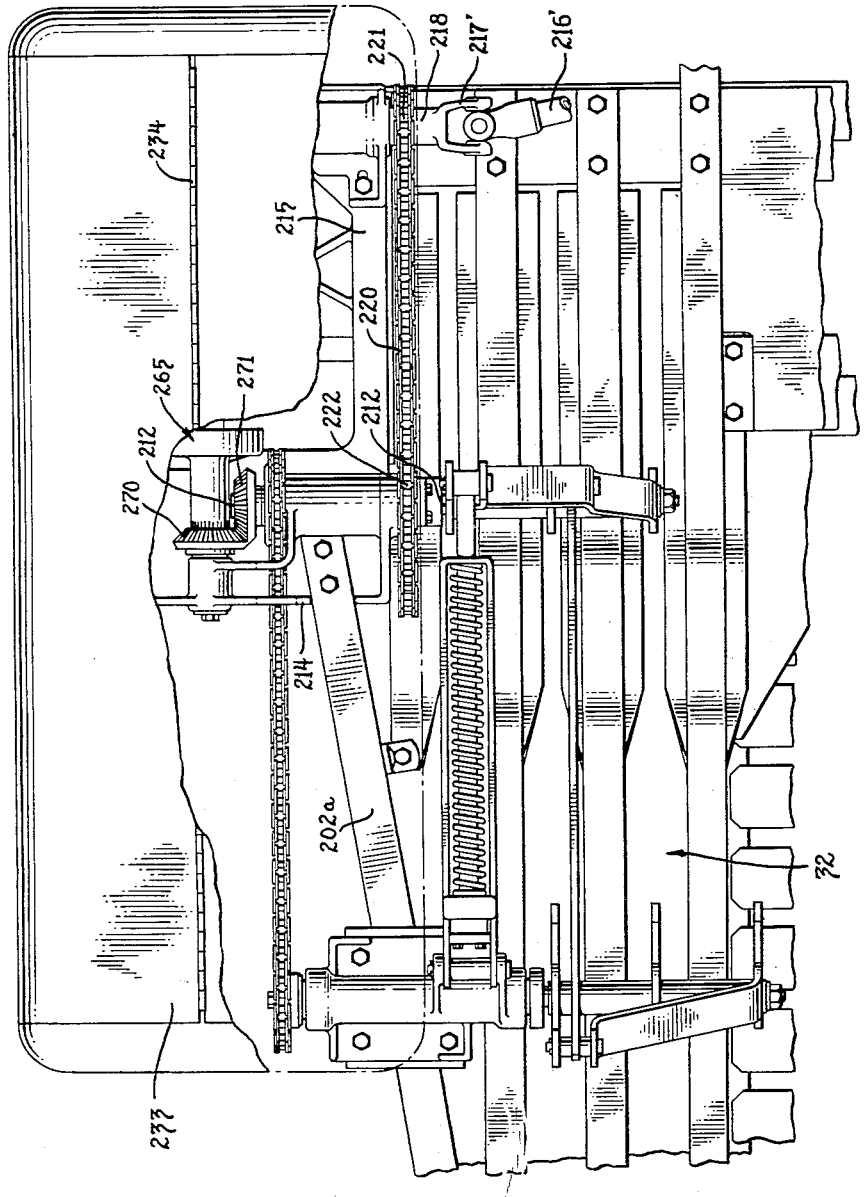
Fig. 2 is a fragmentary top view of the transfer mechanism incorporated in the baler shown in Fig. 1.

As shown in Figs. 3 and 4, the shaft 256 is journaled at opposite ends in bearings 262 and 263, the latter being formed as a part of a bracket 214 carrying a bearing 213 for a shaft 212 which constitutes a part of the drive for the transfer mechanism 32. The bearing 262 in this instance is formed as a part of a bracket 264 bolted or otherwise suitably attached to the top of the frame member 215 adjacent the inboard end of the member. As shown in Figs. 1 and 2, the shaft 212 is driven in timed relation to the reciprocation of the baling plunger from the common transmission 63. The drive, in this instance, is taken from a shaft 87 at the transmission, through a universal joint 215', shaft 216' and universal joint 217' to a shaft 218 journaled in a bearing mounted at the inboard end of the frame 215. A drive chain 220 running over a sprocket wheel 221 in the shaft 218 and a sprocket wheel 222 on the shaft 212 completes the drive connection for the latter shaft.

The shaft 256 is driven in timed relation to the drive for the other elements of the baler from the transfer shaft 212 through the medium of a single revolution clutch 265 (Figs. 4, 14 and 15) engaged under control of the metering device 230.

Bale tier clutch

Referring more particularly to Figs. 4, 14 and 15 of the drawings, the clutch 265 comprises a driving member 266 and a driven member 267 mounted together upon the shaft 256. In the preferred form of the clutch, the driving member 266 comprises a hub portion 268 terminating in a bell-shaped housing 269. The hub 268 is rotatably supported on the shaft 256 and has the end opposite the housing externally splined for driving engagement with a bevel gear 270 by which the clutch member is continuously driven from a bevel pinion 271 fast on the transfer shaft 212. It will be evident that the clutch member is thus driven in timed relation to the drives for the other mechanisms of the baler since the drives all derive from the common transmission 63.

The driven clutch member 267, as herein shown, comprises a cup-shaped element 275 having a coaxial sleeve portion 276 projecting beyond the open end of the element and extending into the housing 269 of the driving member when the clutch parts are assembled on the shaft as shown in Fig. 15. The driven clutch member is drivingly coupled to the shaft 256 through the medium of a driving plate 277 secured to the shaft as by a key 278. The plate and element 275 are rigidly secured together in face-to-face relation by a shear bolt 279 inserted through apertured flange-like extensions 280 and 281 formed respectively on the plate and element as shown in Fig. 4.

To provide a disengageable connection between the driving and driven clutch members, the bell housing 269 is formed with an inwardly projecting tooth or dog 283 (Fig. 14) engageable with a roller 284 journaled on a clutch finger 285 pivotally supported on the clutch element 275 to swing transversely of the axis of the element and into and out of the path of the dog 283. As herein shown, support for the clutch finger is provided by a pin 286 received in alined apertures in the inner face of the member 275 and in a radially projecting lip 287 formed on the hub 276 of the element. A compression spring 288 acting between the hub and the finger urges the latter in a direction to interpose the roller 284 in the path of the clutch dog so as to engage the clutch.

Supported on the clutch finger 285 for pivotal movement about an axis transverse to the finger pivot is a trip arm 290. As shown in Figs. 14 and 15, the pivotal support for the trip arm is provided by a pin 291 and a torsion spring 292 provided on the pin yieldably biases the arm against a stop lug 293 on the clutch element 275. As the driven clutch element rotates, the arm is traversed through a path intercepted by the radially projecting cylindrical head 294 of a trip release arm 295. This arm is pivoted on a support 296, in this instance formed as an integral part of the frame structure 215, for swinging movement toward and from the clutch. A tension spring 297 acting between the frame and the release arm yieldably maintains the release arm in a position to intercept the trip arm. Upon interception of the trip arm, the trip finger assembly is rocked to the disengaged position in which it is shown in Fig. 14. In this position the roller 284 is lifted out of the path of the dog 283 thus interrupting the driving connection between the driving and driven clutch members.

It will be evident that engagement of the clutch may be effected by releasing the trip finger assembly from engagement with the release arm so that the spring 288 may swing the assembly to engaged position. This is done by swinging the trip arm 290 on its pivot so that it clears the release arm lead 294. When the trip arm passes beyond the head as the driven clutch element starts rotation, the spring 292 restores the arm to normal position so that it will be intercepted by the release arm upon completion of a single revolution. As the end of the revolution is approached a cam or guide projection 298 on the element 275 swings the release arm 295 outwardly to clear the projecting parts of the clutch but allows the arm to swing back to its normal rest or intercepting position in a recess 299 in the stop lug 293 in time to intercept the trip element 290 and thus interrupt the drive after one revolution.

In the exemplary baler, the swinging of the trip arm 290 to clutch-engaging position is effected by the metering device 230 when a bale in process of formation is completed. The metering device, as shown in Fig. 14, comprises a toothed wheel 300 fixed to the lower end of a generally vertical shaft 301 journaled on a bracket 302 rigidly attached to the frame member 215 at one side of the baling chamber. The bracket is positioned so that the edge portion of the wheel 300 projects through a slot 303 in the side wall 96 of the baling chamber for engagement with the bale being formed in the chamber. As the bale is built up, it is pushed rearwardly in the chamber and the metering wheel and its shaft rotatable proportionally to such movement.

Mounted on the upper end of the shaft 301 is a radially projecting metering finger 305 having its outer end position for engagement with the trip arm 290 as the finger rotates with the metering shaft. The arm and shaft are connected for limited relative rotation by ya pin 306 fixed on the shaft and engaged in a slot 307 in the hub portion of the finger, as shown in Fig. 4. A torsion spring 308 acting between the shaft and finger maintains the latter in the advanced position in which it is shown in Fig. 4. However, the spring 308 is relatively weak and permits the finger to remain stationary when it initially engages the trip arm 290, and the shaft 301 continues to rotate. Spring 308 is thus tensioned and when the pin 306 reaches the end of the slot 307, it completes a positive driving connection between the shaft and finger and the latter then rotates to swing the trip arm out of engagement with the head 294 of the release arm. This brings about the engagement of the clutch as above explained. In practice, the metering finger is dimensioned so that it can pass the trip arm as the latter swings to trip position and the tension spring 308 then snaps the finger out of the path of the trip arm to provide ample clearance for the clutch parts as the trip arm starts to rotate with the driven clutch member.

It will be evident from the foregoing that the clutch is engaged to drive the shaft 256 through a single revolution upon completion of each bale. As the clutch is tripped in response to a rearward movement of the bale, engagement necessarily takes place at or near the end of the compressing stroke of the baling plunger. The precise point at which the clutch is tripped is immaterial, however, since, as previously explained, the plunger is slotted to afford clearance for the needles 246 in case they are advanced before the plunger is retracted. As the drive is timed and coordinated with the movements of the baling plunger and other driven parts of the baler, ample time is provided for retraction of the plunger and for operation of the tying mechanism before the plunger is again advanced to compressing position.

Wire twister

The wire twister 231 provided by the present invention is characterized by its simple, rugged construction and its ability to twist the wire ends together so as to complete the tie around the bale and to maintain the continuity of the top and bottom wires and to sever the bale tie from the supply strands. The twister also acts to kink or crimp the severed wire ends so that the wires remain securely twisted together and automatically tuck themselves into the bale for safer manual handling.

Referring to Figs. 3-10 of the drawings, the wire twister in its preferred form comprises two similar twisting units 310, one for each of the two wire strands wrapped about a bale, as above described. The twisting units 310 are carried by a pendulum assembly 311 suspended from the shaft 256 and are respectively driven by an outboard twister gear 312 and an inboard twister gear 313, both drivingly coupled to the shaft by keys or the like. The gear 312 is also secured to the driving plate 277 of the clutch 265 as by a bolt 314 (Fig. 15).

As shown in Figs. 3 and 4, the gears 312 and 313 are spaced apart along the shaft 256 and between them is mounted the pendulum assembly 311. This assembly comprises an elongated base portion 315 which provides support for the twisting units and a central integral hanger portion 316 terminating in a split bearing or hub 317 formed with a bore 318 adapted to rotatably fit around the shaft 256. The hub is split longitudinally so that the unit may be installed on or removed from the shaft 256 without disturbing the shaft or the twister gears 312 or 313 or similar gears for driving the twine knotter to be described later. Screws 319 coacting with suitable caps 320 formed on the hub sections of the pendulum assembly hold the sections together.

As stated heretofore, the twisting units are alike and each is mounted on the pendulum base 315 adjacent one of the twister gears 312 and 313. In the exemplary wire twister, the units are located at the inboard side of the gears, each of which is formed with a section presenting axially facing gear teeth 321 and a toothless or dwell section 322 (Fig. 7). As herein shown, one toothed section extends through approximately two-thirds of the circumference in the gear while the dwell section extends through the other one-third.

Referring more particularly to Figs. 8 and 9 of the drawings, each of the twisting units comprises a housing 325 welded or otherwise rigidly secured to the base 315 of the pendulum assembly. Within the housing 325 is mounted a twister pinion 326 formed, in this instance, with an integral shaft 327 projecting at opposite ends of the pinion and journaled in suitable bearings formed in the base and in the overlying portions of the housing 325, as shown in Fig. 9. An L-shaped anvil 328 fixed to one side of the housing has one leg spaced from and extending over the twister pinion.

The pinion 326 and shaft 327 are formed with a longitudinally extending radial slot 330 dimensioned to receive the two wire strands 237 and 238 with a relatively snug fit so that the wire strands will be twisted together upon rotation of the pinion. To afford clearance for the wires, the pendulum base 315 is formed with a slot 331 (Fig. 10), the housing 325 with a slot 332 (Fig. 8) and the anvil 328 with a slot 333 (Fig. 8), these slots flaring outwardly to effectively guide the wires into the pinion slots when presented thereto by the needle 246.

The pinion 326 is formed around its entire periphery with teeth 335 dimensioned for cooperation with the teeth 321 of the twister gear, the gear and pinion being complementally beveled, as shown in Fig. 9. At one side of the pinion the lower ends of the teeth 335 are cut away to define a flat bottomed groove 336 for cooperation with the dwell section 322 of the gear 313 which, as shown in Fig. 9, constitutes a relatively narrow arcuate rib. Accordingly, the pinion 326 is locked against rotation while the dwell portion of the gear passes over it and the parts are so proportioned that in this dwell position the slot 330 is presented in alinement with the slots 331, 332 and 333 and thus open for the reception of the wires.

In the particular tying mechanism illustrated, the arrangement is such that for each revolution of the twister gear 313 (or its companion gear 312) the pinion 326 of the associated twisting unit rotates through four complete revolutions and remains stationary or dwells for predetermined intervals at both the beginning and the end of a cycle to allow for the performance of other functions of the mechanism. More particularly, the gear and pinion arrangement provides an intial dwell sufficient to allow the needles to advance and present the wires to be twisted in the slots in the twister pinions. Thereafter, the pinion rotates to twist the wires together and again dwells while the wires are severed and kinked.

Journaled on the pendulum base 315 and housing 325 rearwardly of the gear 326, is an upright shaft 337 which at its upper end carries a wire retaining finger 338 (Figs. 8 and 9). The finger may be welded or otherwise rigidly fixed to the shaft and is formed with a hook-like end 339 having an inwardly facing cam edge 340 adapted to swing generally transversely of the slot and anvil 328 upon rotation of the shaft.

Welded or otherwise rigidly fixed on the shaft 337 immediately below the anvil 328 is an upper kinker and cutter element 341. A lower kinker element 342 (Figs. 9 and 10) is keyed to the lower end of the shaft and held in place thereon by a nut 343. A tension spring 344 connected between the lower kinker element and the pendulum base 315 yieldably urges the shaft 337 to the retracted position in which it is shown in Figs. 8 and 10.

As shown in Figs. 8 and 9, the upper kinker and cutter element is in the form of an arm having its outer end portion bent at an angle such that its forward or leading edge 345 lies approximately parallel to the slot in the anvil and twister pinion when the shaft 337 is in its fully retracted position. The arm 341 below the edge 345 is undercut as at 346 (Fig. 9) to constitute the edge of the kinking lip operable to bend or kink the twisted wires as the element is rotated. Seated in a recess in the lower face of the arm is a knife element 347 adapted to cooperate with one edge of the slot in the shaft 327 to shear the wires extending through the slot.

The lower kinker element 342 as shown in Figs. 9 and 10, comprises an arm having a generally straight forward edge merging into a forwardly projecting rounded nose 348 adapted to swing across the slot 331 in the pendulum base to bend or kink the twisted section of wires wrapped around a bale. A transverse recess 349 in the inner face of the kinker element affords clearance for the wires in the kinking operation.

Provision is made for rocking the kinker shaft 337 from its retracted position to an operated position in timed relation to the operation of the other elements of the bale-tying mechanism. Preferably, such rocking is effected by a cam lug 350 formed on the inner face of the twister drive gear, as shown in Fig. 8. As shown, the cam is positioned to engage the outer edge of the upper kinker element 341 which has its rear edge formed with a slightly recessed cam engaging surface 351 for that purpose. It will be understood, of course, that the cam 350 is located on the twister gear to bring about the operation of the kinkers and cutter at precisely the right time in the operating cycle of the mechanism.

Having in mind the construction and operation of the wire twisting mechanism above described, the operation of this mechanism and its relation to the other elements of the baler will be readily understood. Thus, upon completion of a bale, the metering device 230 trips the clutch 265 to initiate rotation of the shaft 256 through a single revolution. As the metering device is operated as an incident to the rearward movement to the bale under pressure of the baling plunger, the cycle of the shaft 256 will start approximately at the time the plunger completes its compressing stroke.

In the initial rotation of the shaft 256, the cam 255 acts to swing the needles 246 upwardly carrying the wire strands 238 up through the baling chamber. As the tip portions of the needles pass beyond the upper wall of the baling chamber, the guide rollers 252 and 253 engage the companion wire strand 237 extending across the top of the bale and carry both strands forwardly and into the alined slots in the twister pinion 326 and associated elements of the twisting units. It will be appreciated of course that during this interval the dwell portions of the twister gears 312 and 313 engage the dwell slots 336 of the pinions holding the pinions against rotation and presenting the slots facing in a direction to receive the wires.

Immediately after the wires enter the slots in the twister pinions, the dwell sections of the twister gears pass from the pinions and the teeth 321 of the gears engage the teeth of the pinions to rotate them. In the present instance, the pinions are driven through four revolutions, thus twisting the wires 237 and 238 together with four twists both above and below the pinions. As this point the dwell portions of the gears again engage the pinions to hold them stationary while the cam 350 imparts rocking movement to the kinker shaft 337. At or about this time the cam 255 may also begin the return movement of the needles 246.

As the kinker shaft is rocked toward operated position, the wire retaining finger 338 clamps the wires against the anvil 328 to hold them firmly while the knife element 347 severs the wires at the upper edge of the twister pinion, that is, between the two twisted sections formed by the kinker pinion. This leaves the two wires from the spools joined together by the twisted joint 245 to provide the continuous loop across the bale chamber for tying the next bale. The kinking lip 345 of the upper kinker element 341 acts to bend or kink the twisted wire section 245 applying a substantially right angle bend or kink thereto.

The cutting of the wires as above described leaves the wires around the bale united by a twisted joint 352. The lower kinker element 342 applies a similar bend or kink to the twisted wire section 352 which enables that section to tuck itself into the bale and prevents untwisting of the wires. Upon completion of this cutting and kinking operation, the cam 350 permits the kinker shaft to return to normal position under the urging of the spring 344, and the strands 237 and 238, now united by the twisted wire joint 245, are pulled out by the new material forced rearwardly in the baling chamber by the next advance of the baling plunger. The completed bale securely tied and with the wires completely severed from the continuous strands is thus free to move rearwardly in the baling chamber until discharged by the building up of successive bales ahead of it.

To avoid any possibility of the wires becoming caught in the twister mechanism during the withdrawal of the needles, provision is made for swinging the pendulum assembly 311 and the twister units 310 from the operating position shown in Fig. 7 to a rearward withdrawn position as shown in Fig. 5. The pendulum swinging means, as shown, comprises a link 353 (Figs. 4, 5 and 7) pivotally supported at one end by a pin 353' between the legs of a U-shaped bracket 354 bolted or otherwise suitably secured to the forward portion of the frame 215. Adjacent its free end the link 353 carries a follower roll 355 adapted to coact with the cam edge of a cam disc 356 bolted to the outboard face of one of the twister gears, in this instance the inboard gear 313. At the side opposite the roll 355, the link 353 carries a roll 357 engageable in a slot 358 in the pendulum hanger 316. As shown in Fig. 9, the rolls 355 and 357 are mounted on the link by means of a common bolt 359 and secured in place by a nut 360 which is turned down for the major portion of its length to provide a bearing for the roll 355. A tension spring 361 connected between the link and a bracket 362 carried on one of the bearing caps 320 urges the link upwardly to maintain the cam roll 355 in contact with the cam surface of the cam 356.

As will be seen by reference to Figs. 5 and 7 of the drawings, the cam 356 is formed to provide a generally circular cam surface 363 of relatively large diameter throughout the major portion of its circumference. This cam surface is effective to force the link 353 downwardly and due to the form of the slot 358, the pendulum assembly is swung to and retained in the forward or operating position in which it is shown in Fig. 7. The cam surface 363 is interrupted by an abrupt dropoff 364 which permits the link 353 to be swung upwardly by the spring 361 and the roll 357, in this movement, swings the pendulum assembly rearwardly to the position shown in Fig. 7. As the cam continues its rotation, a sloping cam surface 365 returns the link to its lower position and swings the pendulum assembly forwardly to operating position.

The pendulum mounting of the twisting units 310 is also advantageous in affording convenient access to the twisting units for adjustment or replacement. Thus, by withdrawing the pin 353' from the end of the link 353, the entire pendulum assembly is freed for swinging into a fully retracted position, as shown in Fig. 6, in which the twisting units are readily accessible for cleaning, adjustment or other attention.

*Twine knotter*

Figure 12:
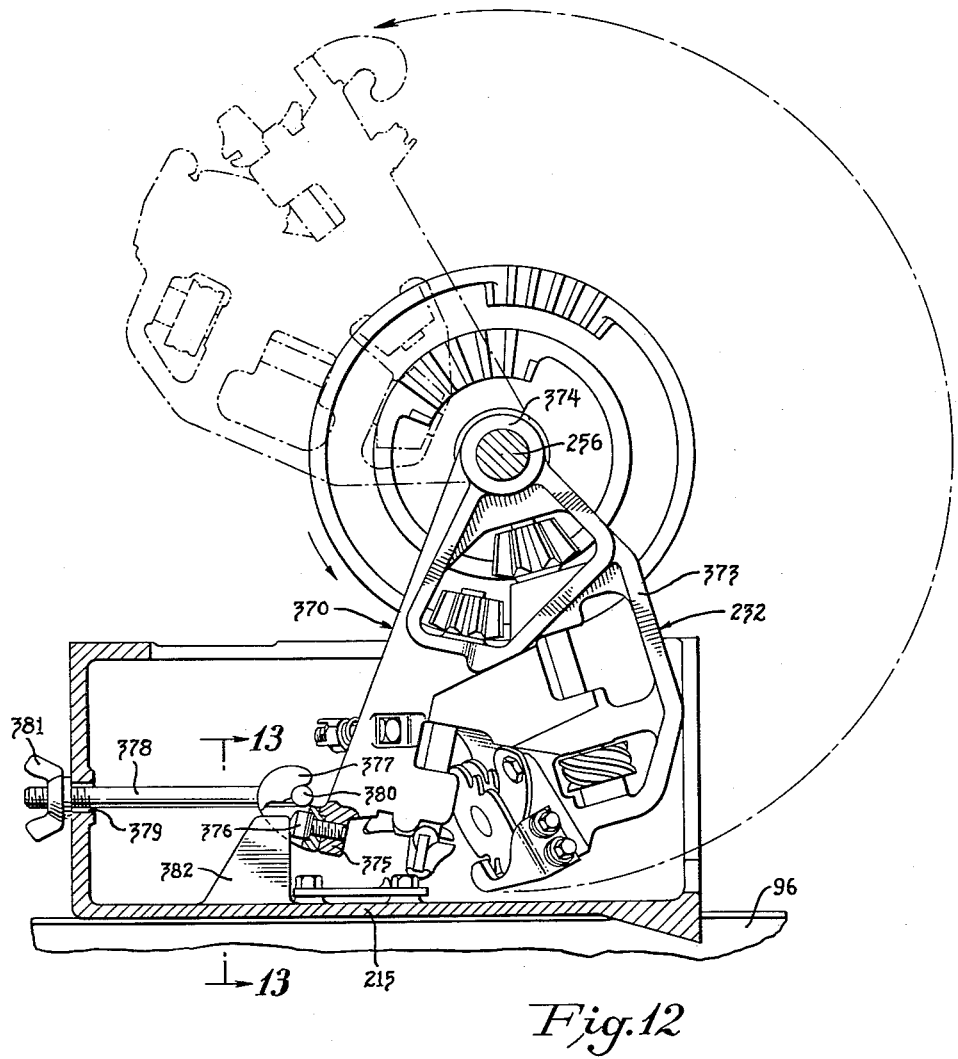
Fig. 12 is a sectional view taken in a plane substantially on the line 12—12 of Fig. 11.
Figure 13:
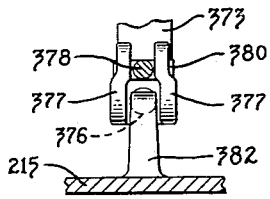
Fig. 13 is a fragmentary sectional view taken in a plane substantially on the line 13—13 of Fig. 12.

As explained above, a feature of the bale tying mechanism of the present invention is the provision for convenient interchangeability of the wire twisting mechanism 231 above described, and the twine knotting mechanism 232. Referring to Figs. 11–13 of the drawings, the knotting mechanism as shown herein comprises a pair of knotting units 370 (Fig. 12) which may be of conventional construction. As is well known, such construction comprises means for holding the free end of a strand and cooperating means for tying that end to the portion wrapped around the bale and presented to the mechanism by the needle. Also included in the mechanism is a cutter for severing the section of the strand looped around the bale.

The knotting units 370 are respectively driven by an outboard drive gear 371 and an inboard drive gear 372 mounted on the shaft 256 in place of the gears 312 and 313. As when the tying mechanism is used with the wire twister, the shaft 256 is driven by the clutch 265 through a cycle of a single revolution when the clutch is tripped by the metering device 230 upon completion of a bale.

The knotting units 370 are alike and, for use in the instant baler, each is carried in a frame 373 having an integral sleeve or hub 374 adapted to be rotatably supported on the shaft 256. In accordance with the invention the frame structure 215 is constructed and arranged so that advantage may be taken of the above type of mounting to allow swinging of the knotter units to positions affording convenient access to the units for cleaning or adjustment. More particularly, the frame 215 which is of generally box-like construction, as previously described, is formed with a gap in its rearwardly facing wall permitting swinging of the units from the operating position shown in full lines in Fig. 12 through an arc of slightly more than 180° to the retracted or clearing position shown in broken lines in that figure.

To insure proper positioning of the knotting units for cooperation with the needles 246, which carry the twine around the formed bale and up through the baling chamber, as previously described, provision is made for releasably locking the units in predetermined fixed positions. For this purpose, the frame 373 is formed with an extension 375 at its lower forward edge. To this extension is secured as by a headed screw 376 a U-shaped latch element presenting two laterally spaced hook-shaped fingers 377 (Fig. 13). A T-shaped lock bolt 378 inserted through an aperture 379 in the front wall of the frame structure 215 extends between the fingers and terminates in a head 380 adapted to engage the hook portions of the fingers 377, as shown in Fig. 12. A wing nut 381 or the like, threaded on the forward end of the bolt, serves to draw the bolt and knotter frame rearwardly to a position defined by a stop lug 382, herein shown as rigid with and projecting upwardly from the base of the frame structure. In the particular mechanism illustrated, the lug 382 is located and dimensioned to fit between the fingers 377 and coact with the head of the screw 376.

It will be apparent that as long as the bolt 378 is pulled up tight by the wing nut 381, the knotter frame will be held against the stop lug 382 and the knotter rigidly secured in operating position. When the knotter requires cleaning or adjustment, it is only necessary to loosen the nut 381 sufficiently to disengage the head 380 from the fingers 377 and the frame 373 can then be swung rearwardly and upwardly to the cleaning position. In this position the knotter unit is fully exposed and conveniently accessible for servicing.

We claim as our invention:

1. Wire tying mechanism for use in a baler comprising, in combination, a rotatably driven twister gear, a twisting unit including a twister pinion radially slotted to receive a pair of wires, means spaced from said pinion for holding the wires securely in side-by-side relation, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the wires between the holding means and the opposite sides of the pinion, a shaft supported at one side of said pinion to rock about an axis parallel to the axis of the pinion, wire cutting means carried by said shaft, and means on said gear operative during the dwell period of the pinion for rocking said shaft and said wire cutting means to sever the wires between the two twisted sections.

2. Wire tying mechanism for use in a baler comprising, in combination, a rotatably driven twister gear, a twisting unit including a twister pinion radially slotted to receive a pair of wires, means spaced from said pinion for holding the wires securely in side-by-side relation, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the wires between the holding means and the opposite sides of the pinion, a shaft supported at one side of said pinion to rock about an axis parallel to the axis of the pinion, means on said gear operative to rock said shaft about its axis while said pinion is stationary, means carried by said shaft operative upon such rocking to sever the wires between the twisted sections, and other means carried by said shaft for transversely bending the twisted wire sections.

3. Wire tying mechanism for use in a baler comprising, in combination, a rotatably driven twister gear, a twisting unit including a twister pinion radially slotted to receive a pair of wires, means spaced from said pinion for holding the wires securely in side-by-side relation, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the wires between the holding means and the opposite sides of the pinion, a shaft supported at one side of said pinion to rock about an axis parallel to the axis of the pinion, means on said gear operative to rock said shaft about its axis while said pinion is stationary, means carried by said shaft for gripping the wires at one side of the pinion to retain them in the twisting unit, and other means carried by said shaft for severing the wires between the two twisted sections and for bending said twisted sections.

4. Wire tying mechanism for use in a baler comprising, in combination, a rotatably driven twister gear, a twisting unit including a twister pinion radially slotted to receive a pair of wires, means spaced from said pinion for holding the wires securely in side-by-side relation, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the wires between the holding means and the opposite sides of the pinion, a shaft supported at one side of said pinion to rock about an axis parallel to the axis of the pinion, means on said gear operative to rock said shaft about its axis while said pinion is stationary, a radially projecting arm on said shaft positioned to swing across the slot in said pinion in the rocking of the shaft, and a wire cutting element carried by said arm cooperating with the pinion to shear the wires emerging from the slot.

5. Wire tying mechanism for use in a baler comprising, in combination, a rotatably driven twister gear, a twisting unit including a twister pinion radially slotted to receive a pair of wires, means spaced from said pinion for holding the wires securely in side-by-side relation, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the wires between the holding means and the opposite sides of the pinion, a shaft supported at one side of said pinion to rock about an axis parallel to the axis of the pinion, means on said gear operative to rock said shaft about its axis while said pinion is stationary, a radially projecting arm on said shaft positioned to swing across the slot in said pinion in the rocking of the shaft, a wire cutting element carried by said arm operative to shear the wires closely adjacent one side of the pinion, and a lip formed on said arm operative to form a bend in the twisted section of the wires at said one side of the pinion.

6. Wire tying mechanism for use in a baler comprising, in combination, a rotatably driven twister gear, a twisting unit including a twister pinion radially slotted to receive the end portions of a pair of wires wrapped around a bale, a member operative to engage and hold the ends of the wires at the side of the pinion remote from the bale, said gear and said pinion having directly coacting driving and dwell sections effective to rotate the pinion through a plurality of revolutions during a portion of a rotation of the gear and to hold the pinion stationary during the remaining portion of the gear revolution, said pinion operating in its rotation to twist together the end portions of the wires between the bale and said member and opposite sides of the pinion, a shaft supported at one side of said pinion to rock about an axis parallel to the axis of the pinion, means on said gear operative to rock said shaft about its axis while said pinion is stationary, a radially projecting arm on said shaft positioned to swing across the slot in said pinion in the rocking of the shaft, a wire cutting element carried by said arm operative to shear the twisted wires closely adjacent one side of the pinion, means on said arm operative to form a bend in the twisted section of the wires at said one side of the pinion, and other means carried by said shaft operative to form a bend in the twisted section of the wires at the other side of the pinion.

7. Wire twisting mechanism for use with a baler comprising, in combination, a shaft supported on the frame of the baler and extending transversely across the chamber in which bales are formed, means operable upon the completion of the bale for driving said shaft through a single revolution, a pair of twister gears secured to said shaft and spaced apart axially thereon, a pair of wire twisting and severing units, means supporting said units to swing about the axis of said shaft including a member having a bearing rotatably mounted on the shaft and a hanger portion extending radially from said bearing, means on the hanger portion of the member mounting said units in position to be driven by the respective gears, said hanger portion having an elongated, generally radially extending slot, means operable as an incident to the rotation of said shaft for swinging said member about the axis of said shaft, and means normally operative to limit the swinging movement of said member comprising a link pivoted at one end on the baler frame and mounting a laterally extending roller adjacent its other end engageable in the slot in said hanger portion of the member.

8. Wire tying mechanism for use with a baler comprising, in combination, a shaft supported on the frame of the baler and extending transversely across the chamber in which bales are formed, means operable upon the completion of the bale for driving said shaft through a single revolution, a pair of twister gears secured to said shaft and spaced apart axially thereon, a pair of wire twisting and severing units, a pendulum assembly swingably mounted on said shaft between said gears, said assembly supporting said units in positions to be driven by the respective gears, means operable incident to the rotation of said shaft for swinging said assembly between two different limit positions, and means normally operable to restrict the swinging movement of said assembly to said two positions, said last mentioned means being releasable to permit swinging of the assembly beyond one of said limit positions to a third position affording convenient access to said units for adjustment, said pendulum assembly being mounted on the shaft by means of a bearing element constructed in two connected sections separable to permit removal of the assembly and twisting units without disturbing the mounting of the shaft.

References Cited in the file of this patent

UNITED STATES PATENTS

| | | |
|---|---|---|
| 2,546,324 | Tuft et al. | Mar. 27, 1951 |
| 2,589,083 | Hill | Mar. 11, 1952 |
| 2,621,588 | McClellan et al. | Dec. 16, 1952 |
| 2,622,508 | Hill | Dec. 23, 1952 |
| 2,651,252 | Pope | Sept. 8, 1953 |
| 2,701,517 | Hauswirth | Feb. 8, 1955 |